United States Patent [19]

Born

[11] 4,299,751

[45] Nov. 10, 1981

[54] COLD-SETTING, POLYURETHANE-BASED MOLDING MATERIAL BINDER

[75] Inventor: Thorwald Born, Bad Dürkheim, Fed. Rep. of Germany

[73] Assignee: Huttenes-Albertus Chemische Werke GmbH, Dusseldorf, Fed. Rep. of Germany

[21] Appl. No.: 158,886

[22] Filed: Jun. 11, 1980

[30] Foreign Application Priority Data

Jun. 13, 1979 [DE] Fed. Rep. of Germany ....... 2923840

[51] Int. Cl.³ .............................................. C08L 75/04
[52] U.S. Cl. ......................... 260/30.4 N; 260/32.8 N; 260/33.2 R; 528/48; 528/85
[58] Field of Search .............. 528/48, 85; 260/30.4 N, 260/32.8 N, 33.2 R

[56] References Cited

U.S. PATENT DOCUMENTS 3,925,296  12/1975  Stone et al. .......................... 528/85
3,933,727   1/1976  Schmid ................................. 528/85

OTHER PUBLICATIONS

Gould, *Mechanism & Structure in Organic Chemistry*, Holt-Dryden, 1959, pp. 57-60.

*Primary Examiner*—Maurice J. Welsh
*Attorney, Agent, or Firm*—Manfred M. Warren; Robert B. Chickering; Glen R. Grunewald

[57] ABSTRACT

Cold-setting, polyurethane-based molding material binder for producing molds and cones comprising phenolic polyol and a polyisocyanate characterized in that the polyol is dissolved in a polar high boiling solvent which has a Hansen hydrogen bonding solubility parameter of at least 3.5.

4 Claims, No Drawings

COLD-SETTING, POLYURETHANE-BASED MOLDING MATERIAL BINDER

In connection with binder-containing moulding material mixtures for producing moulds and cores, increasing importance is being attached to polyurethane-based, cold-setting binders. These binders are formed with the moulding material mixture as a result of reacting polyols with at least 2 OH groups (resin component) and polyisocyanates with at least 2 NCO groups (cross-linking component) in the presence of reaction accelerators, such as e.g. tertiary amines or organometallic compounds, which ensure a rapid reaction and consequently a sufficiently short binder setting time.

When producing such a polyurethane-linked moulding material mixture, the normal procedure is for the granular mould base material (e.g. quartz sand or the like) to be initially mixed with the resin component dissolved in a solvent and then with the (generally also solvent-dissolved) cross-linking agent. The reaction accelerator can either be added in the final phase of the mixing process or only after removing the moulding material mixture from the mould by briefly gasing the latter in the mould for a short time with a gaseous tertiary amine, e.g. triethyl amine.

In principle, all monomeric to polymeric polyols are suitable as the resin component of the polyurethane binder, provided that their OH groups have an adequate reactivity relative to the NCO groups of the polyisocyanate and provided that they can be brought into the form of a solution with an adequately high solids content. It has been found, however, that the use of monomeric phenols, e.g. bis-phenols, does not lead to foundry binders of sufficient strength and, consequently, is not acceptable in practice. In view of this, already a mixture of monomeric phenols and precondensates with free OH-groups has been proposed as the resin component, because with such mixture a better strength can be reached in comparison to the use of monomeric phenols only. At present, in foundry practice, preference is given to sole precondensates with free OH groups, such as e.g. a phenol-formaldehyde condensate with free methylol groups dissolved in aromatic solvents which can optionally also be diluted with polar, high-boiling solvents as solubilizers.

Moulds and cores produced with precondensate-containing binders have proved very satisfactory with regard to their setting time, their initial strength and their final strength. However, it has been considered unsatisfactory that these moulds and cores, particularly at low casting temperatures, e.g. in the field of light alloy casting have relatively poor disintegration characteristics, i.e. after casting the binder then still has such a high residual strength that in particular the cores can only be removed with considerable difficulty from the finished casting. This leads to a correspondingly high expenditure in the foundry cleaning station.

The poor disintegration characteristics of the known polyurethane binders formed with polyolic precondensates can be counteracted to a certain extent by adding certain disintegration-aiding additives to the moulding material mixture or by reducing the binder content in the moulding material mixture to the lowermost acceptable limit. However, both these possibilities only provide makeshift solutions, because they both lead to a serious decrease in the strength of the as yet uncast moulds and cores without completely eliminating the disintegration problems thereof after casting.

Thus, the foundry industry has a considerable need for a cold-setting polyurethane binder providing good strength values for the moulds and cores and which also readily disintegrates after casting. The invention aims at providing such a binder.

According to the invention, this aim is satisfied in that the polyol used is a monomeric, mononuclear to trinuclear phenol with at least 2 phenolic OH groups per molecule which, in a concentration of 5 to 15% by weight of OH groups, is dissolved in a polar, high-boiling solvent which is inert with respect to urethane formation and has a $\delta_h$ value of at least 3.5.

Thus, the invention prescribes two conditions for the resin component of the binder, namely the use of special monomeric phenols in combination with a specific solvent for said phenols. It has been found that when this combination is used, an excellent moulding material binder with a polyurethane base is obtained, whose setting time and strength are not inferior to those obtained with binders formed from polyolic precondensates—which is unexpected in view of the hitherto existing experiences with monomeric phenols. Moreover, the binder according to the invention after casting leads to excellent disintegration characteristics of both moulds and cores, which is particularly surprising. In this connection, the binder according to the invention is far superior to those formed with polyolic precondensates, so that the invention has completely breached the hitherto existing gap. The invention also uses a fundamental advantage of monomeric polyols, namely the omission of the process stage for producing a precondensate.

In accordance with the present invention, the term "monomeric mononuclear to trinuclear phenol with at least 2 phenolic OH groups per molecule" is understood to mean aromatic substances with 1 to 3 individual, i.e. not anellated benzene nuclei having in all at least two phenolic OH groups. Typical preferred examples are (individually or mixed together) divalent and polyvalent mononuclear phenols, particularly resorcinol and hydroquinone, as well as bisphenols of general formula

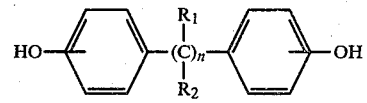

with (for n=1)
$R_1$=methyl and $R_2$=methyl (bisphenol A)
$R_1$=methyl and $R_2$=ethyl (bisphenol B)
$R_1$=methyl and $R_2$=butyl
$R_1$=methyl and $R_2$=amyl
$R_1$=methyl and $R_2$=heptyl or with (for n=1)
$R_1+R_2$=pentamethylene or with (for n=2)
$R_1$=ethyl and $R_2$=hydroxyl.

The solvent for the monomeric, mononuclear to trinuclear phenol must be polar and high-boiling (boiling point above 140° C.) and must naturally not influence the reaction of urethane formation between the phenol and the polyisocyanate, i.e. it must not for example contain amino groups which catalyse urethane formation and must e.g. also contain no OH groups of monovalent alcoholic compounds which lead to a premature chain break during cross-linking. The other decisive condition is that the solvent must have a $\delta_h$ value of at least 3.5.

The term "$\delta_h$ value" covers the capacity of a solvent for formation of hydrogen bridges and is defined by Charles M. Hansen, Journal of Paint Technology, Vol. 39, No. 505, 1967, pp. 104ff ("Three dimensional solubility parameter- Key to paint component affinities"). Hansen used the specific cohesion energy (which can be determined from the heat of evaporation and the molar volume) for characterising the dissolving behaviour of solvents and divided this up into a portion based on general intermolecular forces (dispersion forces), a portion due to dipole forces and a portion due to forces resulting from hydrogen bridge formation. From this, he derived three solubility parameters $\delta_d$, $\delta_p$, and $\delta_h$, which all have the dimension $$\left[ \frac{\text{cal}}{\text{cm}^3} \right]^{\frac{1}{2}}.$$

With these parameters, only the $\delta_h$ values (i.e. the influence of hydrogen bridges) is important for the invention. The $\delta_d$ value (influence of dispersion forces) is approximately the same for all solvents and with regard to the $\delta_p$ value (influence of dipole forces) the invention merely requires that the solvent must be polar (whereby in general the $\delta_p$ value can be somewhat lower of the $\delta_h$ value is well above 3.5).

It has not as yet been explained why the capacity of the solvent to be able to form adequate number of hydrogen bridges forms a decisive criterion of the invention, but there is reason to assume that at normal temperatures the solvent is attached by hydrogen bridge formation relatively firmly to the urethane bonds (present in large quantities due to monomeric phenol) in the hardened binder and in this way contributes to the strength of the cured binder, but that this stabilizing effect is lost at higher temperatures, with the result that the destruction of the binder by the casting heat becomes more easy. In this context, it is to be noted that even in the case of prolonged storage the solvent is not evaporated in significant quantities from the hardened moulds and cores, which is not the case with the solvents outside the scope of the invention. It has also been found that with solvents not covered by the invention (including those whose $\delta_h$ value is only slightly below 3.5) a successful result is still not obtained if a phenol covered by the scope of the invention is used and that conversely, no improvement in the disintegration characteristics of the moulds and cores can be obtained with a solvent covered by the invention in conjunction with a polyolic precondensate (instead of a phenol covered by the invention). These findings sufficiently support the above-mentioned assumptions.

The following Table 1 summarises selected examples of polar, high-boiling solvents which are inert with respect to the urethane formation, which have a $\delta_h$ value above 3.5 and which are suitable individually or mixed with one another for the purpose of the invention.

TABLE 1

| Solvent | $\partial_h$-Value |
| --- | --- |
| Isophorone | 3,6 |
| γ-butyrolacetone | 4,5 |
| Glycol diethers | |
| Dimethyl diglycol | 4,5 |

TABLE 1-continued

| Solvent | $\partial_h$-Value |
| --- | --- |
| Methylbutyl glycol | approx. 3,5 to 4,5 |
| Dimethyl triglycol | approx. 3,5 to 4,5 |
| Methylbutyl diglycol | approx. 3,5 to 4,5 |

The concentration of the phenols in the solution should be such that there is a range of 5 to 15% by weight OH group. OH group concentration values below 5% by weight due to a too low solids content of the solution and consequently to unsatisfactory strength values for the moulds and cores produced. However, a too high phenol concentration, i.e. OH group concentrations above 15% by weight, inadequate strength values for the moulds and cores are obtained, as in this case too much polyisocyanate must be added. In the case of mononuclear phenols (e.g. hydroquinone) it is proved to be advantageous to use a concentration in the range 40 to 50% by weight, but a somewhat higher concentration of 50 to 60% by weight with polynuclear phenols (e.g. bisphenol). This corresponds to an OH group concentration of approx. 12 to 15% by weight or 7 to 9% by weight.

Difficulties are not encountered in producing a phenol solution usable as the resin component. If the phenols do not dissolve at ambient temperature in general it is merely necessary to gently heat the solvent. However, it is naturally important that the solution remains stable, i.e. that the phenols do not crystallise out again in the course of time. This is ensured if the conditions according to the invention are respected.

The phenol solution can also contain conventional additives such as e.g. silanes or high-boiling, aromatic hydrocarbons and/or petroleum for the purpose of making water-repellents. In particular, high-boiling, aromatic hydrocarbons can at the same time be used for matching the phenol solution compatability (miscibility) with the cross-linking component, if this is needed in certain cases.

A group of further additives which has proved advantageous in quantities up to 10% by weight is formed by aliphatic compounds with at least 2 OH groups such as ethylene glycol, glycerin, diethylene glycol and its homologs, as well as polyethers (alkoxylated polyhydroxy compounds). Due to their free OH groups, these additives are reactive, i.e. they are incorporated into the binder structure. On setting, they normally react more slowly than phenols and therefore increase the final strengths of the moulds and cores.

According to the invention, the cross-linking component can be constituted by standard polyisocyanates with at least 2 NCO groups used in the production of polyurethane binders and particular preference is given to those with an aromatic structure. Examples are diphenyl methane-4,4'-diisocyanate, 2,2',6,6'-tetramethyldiphenyl methane-4,4'-diisocyanate, diphenyl dimethyl methane-4,4'-diisocyanate and diphenyl-4,4'-diisocyanate. The polyisocyanates can be used undiluted or dissolved in an organic solvent, preferably in aromatic substances with a boiling range above 160° C. In the case of a solution, the concentration of the polyisocyanates is appropriately in the range above 80%.

The binder according to the invention is processed in conventional manner in that the granular mould base material (e.g. quartz sand) is mixed with the phenol solution (resin component) and the polyisocyanate (cross-linking component). The polyisocyanate quantity should be superstoichiometric. Preference is given to a molar ratio of the OH groups to the NCO groups of 1:1.1 to 1:1.5. The total binder quantity, i.e. phenol solution +polyisocyanate (optionally also in solution) can be in the range 0.8 to 3.0% by weight, based on the mould base material. The reaction accelerator (e.g. a tertiary amine or an organometallic compound) is added either in the final phase of the mixing process or conventional gasing takes place in the mould, as a function of the procedure used.

A number of performance examples of the invention are explained hereinafter.

A number of different phenol solutions were prepared from the phenols and solvents, as well as optionally additives given in the following Table 2, whilst in each case water-repelling properties are given by adding 0.3% silane. Using these phenol solutions as the resin component and conventional foundry sand (quartz sand) various moulding material mixtures were produced in a high speed laboratory mixer and in each case the cross-linking compound was constituted by a diphenyl methane diisocyanate-based polyisocyanate, used either in undiluted form or mixed with aromatic substances as the solvent. The total binder content in the moulding material mixture was adjusted to 2% by weight and the proportions of resin component and/or cross-linking component were varied in such a way that in each case the molar ratios OH/NCO given in Table 2 were obtained.

The moulding material mixtures produced in this way were used to produce testpieces according to DIN No. 52 401, which were hardened by gasing with triethyl amine. During subsequent testing, the strength values given in Table 2 were obtained which fall within a usable range for foundry purposes.

The testing of the disintegration characteristics took place under actual conditions in the foundry. For this purpose, a number of different cores were produced from the binders according to the invention of examples A2 and B3, as well as a number of commercially available polyurethane binders (1, 2 and 3) containing a polyolic precondensate and they were hardened by gasing and were cast with aluminium at 780° C. partly by sand casting processes, and partly by chill casting processes. The times for knocking off the cores were then measured. These times, which represent mean values of in each case about 15 individual values are given in Table 3 and show the clear superiority of the binder according to the invention with respect to the disintegration characteristics.

TABLE 2

| No. | Phenol solvent (parts by weight) | OH/NCO molar ratio | Bending strength (N/cm²) immediately 45', 24h | | |
|---|---|---|---|---|---|
| Example A: | Bisphenol A dissolved in dimethyl diglycol- polyisocyanate without solvent | | | | |
| 1 | 56.0 | 44.0 | 1:1.0 | 206 | 160 | 294 |
| 2 | 56.0 | 44.0 | 1:1.11 | 226 | 177 | 324 |
| 3 | 56.0 | 44.0 | 1:1.23 | 226 | 216 | 373 |
| 4 | 56.0 | 44.0 | 1:1.36 | 235 | 216 | 402 |
| 5 | 56.0 | 44.0 | 1:1.50 | 235 | 265 | 422 |
| 6 | 56.0 | 44.0 | 1:1.66 | 196 | 284 | 412 |
| Example B: | Bisphenol A dissolved in isophorone with the addition of 4% by weight ethylene glycol- polyisocyanate mixed with 15% aromatic solvents. | | | | |
| 1 | 42.4 | 53.6+4.0 | 1:1.14 | 20 | 372 | 392 |

TABLE 2-continued

| No. | Phenol solvent (parts by weight) | OH/NCO molar ratio | Bending strength (N/cm²) immediately 45', 24h | | |
|---|---|---|---|---|---|
| 2 | 46.6 | 49.4+4.0 | 1:1.16 | 80 | 353 | 372 |
| 3 | 50.0 | 46.0+4.0 | 1:1.23 | 110 | 372 | 402 |
| 4 | 53.4 | 42.6+4.0 | 1:1.17 | 160 | 353 | 422 |
| 5 | 53.4 | 42.6+4.0 | 1:1.30 | 118 | 392 | 392 |
| 6 | 53.4 | 42.6+4.0 | 1:1.44 | 90 | 422 | 412 |
| Example C: | As example B, but isophorone without diethyelene glycol addition. | | | | |
| 1 | 50.0 | 50.0 | 1:1.38 | 80 | 383 | 372 |
| Example D: | Resorcinol (dissolved in isophorone) (Iso) and/or hydroquinone (H) dissolved in dimethyl diglycol (DMDG) - polyisocyanate mixed with 15% aromatic solvents. | | | | |
| 1 | 40.0 R | 60.0 Iso | 1:1.22 | 100 | 294 | 323 |
| 2 | 40.0 H | 60.0 DMDG | 1:1.22 | 80 | 170 | 215 |
| Example E: | Bisphenol A dissolved in dimethyl diglycol with the addition of 10% polyether (molecular weight 300 to 400) - polyisocyanate mixed with 15% aromatic solvents. | | | | |
| 1 | 57.0 | 33.0 + 10.0 | 1:1.23 | 206 | 470 | 408 |
| Example F: | Bisphenol A dissolved in a mixture of 15% isophorone and 23.2% dimethyl diglycol with the addition of 3.4% diethylene glycol and 5% aromatic solvents (A) or petroleum (P) - polyisocyanate mixed with 15% aromatic solvents. | | | | |
| 1 | 53.4 | 15.0+23.2+3.4 +5.0 A | 1:1.36 | 137 | 314 | 324 |
| 2 | 53.4 | 15.0+23+3.4+ 5.0 P | 1:1.36 | 128 | 265 | 392 |

TABLE 3

| Test 1: | Sand casting with suction pipe core (approx. 12kg) | | |
|---|---|---|---|
| Comparison | 1: | Knocking off time | 170s |
| " | 2: | " | 168s |
| Example B | 3: | " | 100s |
| " A | 2: | " | 105s |
| Test 2: | Sand casting with gun core (approx. 500g) | | |
| Comparison | 1: | Knocking off time | 70s |
| " | 3: | " | 70s |
| Example B | 3: | " | 20s |
| " A | 2: | " | 30s |
| Test 3: | Chill casting with oil sump core (approx. 12kg) | | |
| Comparison | 1: | Knocking off time | 90s |
| " | 2: | " | 80s |
| Example B | 3: | " | 50s |
| Test 4: | Chill casting with water jacket (approx. 300g) | | |
| Comparison | 2: | Knocking off time | 75s |
| " | 3: | " | 70s |
| Example B | 3: | " | 55s |

I claim:

1. Cold-setting moulding material binder with a polyurethane base for moulding material mixtures for producing moulds and cores, comprising a polyol with at least 2 OH groups in the molecule and a polyisocyanate with at least 2 NCO groups in the molecule, characterised in that the polyol is a monomeric, mononuclear to trinuclear phenol with at least two phenolic OH groups per molecule which is dissolved in a concentration of 5 to 15% by weight of OH groups in a polar, high-boiling solvent which is inert with respect to the urethane formation and with a $\delta_h$ value of at least 3.5.

2. Binder according to claim 1, characterised in that up to 10% by weight, based on the solution, of an aliphatic compound with at least 2 free OH groups is added to the solution.

3. Binder according to claims 1 or 2, characterised in that the solution contains a mononuclear, divalent phenol in a concentration of 40 to 50% by weight.

4. Binder according to claims 1 or 2, characterised in that the solution contains a bisphenol in a concentration of 50 to 60% by weight.

* * * * *

UNITED STATES PATENT AND TRADEMARK OFFICE
CERTIFICATE OF CORRECTION

PATENT NO. : 4,299,751
DATED : November 10, 1981
INVENTOR(S) : Thorwald Born

It is certified that error appears in the above-identified patent and that said Letters Patent are hereby corrected as shown below:

Column 5, line 37, after "conditions in" delete "the" and insert ---a---; and

Column 6, line 26, Table 2, Example E, last column entry, delete "408" and insert ---480---.

Signed and Sealed this

Twenty-third Day of February 1982

[SEAL]

Attest:

GERALD J. MOSSINGHOFF

Attesting Officer

Commissioner of Patents and Trademarks